ns, pub. 1980 by McGraw-Hill Book Co., pp. 24-2 to
United States Patent [19]

Crowe

[11] 4,317,735
[45] Mar. 2, 1982

[54] METHOD OF INHIBITING CROSSLINKING OF AQUEOUS XANTHAN GUMS IN THE PRESENCE OF FERRIC ACID IONS

[75] Inventor: Curtis W. Crowe, Tulsa, Okla.

[73] Assignee: The Dow Chemical Company, Midland, Mich.

[21] Appl. No.: 131,296

[22] Filed: Mar. 18, 1980

[51] Int. Cl.$^3$ .............................................. E21B 43/27
[52] U.S. Cl. ................................ 252/8.55 C; 166/307
[58] Field of Search .................... 252/8.55 C, 174.18, 252/174.19, DIG. 11; 166/307; 426/271

[56] References Cited

U.S. PATENT DOCUMENTS

| | | | |
|---|---|---|---|
| 2,175,095 | 10/1939 | Stoesser | 252/8.55 |
| 2,674,523 | 4/1954 | McDonald et al. | 252/DIG. 11 |
| 3,236,305 | 2/1966 | Parks | 252/8.55 |
| 3,686,123 | 8/1972 | Hiroshi | 252/87 |
| 3,696,044 | 10/1972 | Rutledge | 252/180 |
| 3,826,312 | 7/1974 | Richardson | 166/307 |
| 4,067,389 | 1/1978 | Savins | 166/246 |
| 4,167,214 | 9/1979 | Street | 252/8.55 X |
| 4,199,469 | 4/1980 | Walzer | 252/146 |

FOREIGN PATENT DOCUMENTS

47-25078 10/1972 Japan .
1400198 7/1975 United Kingdom .

OTHER PUBLICATIONS

The Condensed Chemical Dictionary, Ninth Edition, 1977, pp. 77 and 346.

Laurence et al., J. Chem. Soc., Dalton Trans., vol. 15, 1972, pp. 1667-1670.
Davidson, Handbook of Water Soluble Gums and Resins, pub. 1980 by McGraw-Hill Book Co., pp. 24-2 to 24-31.
Kelzan XC Polymer, Technical Bulletin X#5 pub. by Kelco Co., 6-1977.
Hydraulic Fracturing with Xanco-Frac, Technical Bulletin Z#1, pub. by Kelco Co.
Xanthan Gum/Keltrol/Kelzan/A Natural Biopolysaccharide for Scientific Water Control, Second Ed., by Kelco Co., 8-1975.
Mehltretter et al., article in *Industrial and Engineering Chemistry*, vol. 45, No. 12, Dec. 1953, pp. 2782-2784.
Smith et al., article in *Journal of Petroleum Technology*, Sep. 1969, pp. 1121 and 1125-1129.

*Primary Examiner*—Herbert B. Guynn
*Attorney, Agent, or Firm*—L. W. White

[57] ABSTRACT

Aqueous xanthan gums normally crosslink at a pH greater than about 1.5 in the presence of ferric ions. This phenomenon is undesirable under many conditions of use, such as acidizing treatments of wells, and is inhibited or prevented by adding certain soluble alkanoic and/or alkenoic acids to the system. The alkanoic and alkenoic acids have at least 4 carbon atoms and bear at least 2 alcoholic hydroxyl groups per molecule and can be added as the organic acid per se or as a soluble salt or $\gamma$-lactone. Ascorbic acid and erythorbic acid are examples.

13 Claims, No Drawings

METHOD OF INHIBITING CROSSLINKING OF AQUEOUS XANTHAN GUMS IN THE PRESENCE OF FERRIC ACID IONS

BACKGROUND OF THE INVENTION

1. Field of the Invention

This invention pertains to the use of certain compounds to inhibit or prevent the crosslinking of aqueous xanthan gum in the presence of ferric ion.

2. Description of the Prior Art

Various acids have long been used to increase the permeability of a formation surrounding a wellbore. In these treatments, the acid is normally pumped from the surface through iron pipe under pressure into the formation to dissolve various parts of the formations. Such acid treatments have been particularly effective in calcareous formations and have been effective in increasing the production of oil, gas, brine, or even water wells.

During such acid treatments, the treatment acid dissolves iron scale in pipes and iron-containing minerals in the formation. The dissolved iron normally remains in solution until the acid is spent. Upon spending, ferric hydroxide begins to precipitate and plug the formation. Complete precipitation of ferric hydroxide is reached at a pH of about 3.2. Ferrous hydroxide, being more soluble, does not begin to precipitate until a pH of approximately 7.7 and is not generally a problem.

The deleterious effects of ferric hydroxide in wells was recognized by Grebe in U.S. Pat. No. 2,175,081 as early as 1937. Grebe used a strong acid containing sulphurous acid to counter the precipitation problem.

Numerous other procedures have been proposed for avoiding the ferric hydroxide problem. For example, U.S. Pat. No. 2,175,095 suggests including within the acidizing fluid a material such as lactic acid, ammonium acetate, glycine, glycolic acid, citric acid, or the like, which is capable of preventing the precipitation of iron or aluminum hydroxides at normal precipitation pH values. U.S. Pat. No. 2,335,689 suggests adding an iron sequestering agent, such as a polyhydric phenol within the injected acids. U.S. Pat. No. 3,142,335 suggests the use of a sequestering agent containing a mixture of ingredients that function as a pH buffer, such as citric acid or a citrate salt mixed with acetic or formic acids or their salts. U.S. Pat. No. 3,150,081 suggests using mixtures of hydroxyacetic and citric acids; the mixtures are alleged to be cheaper and more effective than the use of either acid alone.

The most common iron sequestering agents in commercial practice are citric acid, ethylenediaminetetraacetic acid (EDTA), nitrilotriacetic acid (NTA), acetic acid, lactic acid, and citric acid/acetic acid mixtures. Data on these sequestering agents is found in the paper by Smith et al., Paper No. SPE 2358, Society of Petroleum Engineers of AIME, (presented Nov. 7-8, 1968).

The problem with most iron sequestering agents is that they are not particularly effective at temperatures beyond about 125°-150° F. Only NTA, citric acid and EDTA have shown any effectiveness at higher temperatures. And of these, EDTA is the only practical sequestering agent because citric acid tends to form insoluble citrates during the course of the well treatment. Such citrates can block the well production almost as effectively as the ferric hydroxide.

The presence of the ferric ions in the treatment acid solution is known to cause other serious problems as well. For example, U.S. Pat. No. 4,096,914 teaches that ferric iron reacts with asphaltenic oil to form insoluble iron-asphaltene compounds. These compounds are insoluble precipitates which likewise plug the formation channels and inhibit production of the desired fluid. The patent teaches that the problem can be solved by incorporating salicylic acid into the treatment acid.

Ferric ion corrosion can also be a problem. Each mole of ferric ion reacts with base metal to form two moles of ferrous ion. Almost any oxidizing source readily converts the ferrous ions to ferric ions, and a vicious circle results.

Additives used to control problems associated with ferric ions in treatment of wells have been called "iron stabilizers" by practitioners in the field.

So the state of the art is such that there is a substantial need to prevent the formation of ferric ions during acid treatment of wells and there is a particular need to prevent the formation and precipitation of ferric compounds as the acid spends. There is also a particular need for aqueous gelled acids which will not crosslink upon spending in the presence of ferric ions. Aqueous gelled acids can be used with a high degree of effectiveness in the acidizing treatment of wells mentioned above.

Various polysaccharides have been used previously as thickeners for aqueous acids, but their performance was less than satisfactory because of the tendency to rapidly degrade with shear and/or high temperatures encountered under conditions of use. Many of these polysaccharides, including xanthan gums, crosslink in the presence of polyvalent metal ions. As an example, aqueous acid gelled with xanthan gum crosslinks readily in the presence of ferric ion at a pH higher than about 1.5.

SUMMARY OF THE INVENTION

It has now been discovered that the crosslinking of aqueous xanthan gums in the presence of ferric ions can be substantially inhibited or prevented by including therein a soluble alkanoic and/or alkenoic acid having at least 4 carbon atoms and bearing at least 2 hydroxyl groups per molecule, and/or a soluble salt or γ-lactone thereof. This combination of ingredients forms novel gelled acid compositions which are particularly useful in acidizing treatments of wells. The gelled acid compositions are viscous fluids which have increased stability against shear and thermal degradation and other properties which result in retarded reaction rates and reduced fluid leak-off during acidizing treatments of subterranean formations surrounding wellbores. The novel aqueous gelled acids have the further advantage of inhibiting or preventing the formation of insoluble compounds (e.g. ferric hydroxide) during such acidizing treatments.

The novel gelled acid compositions are far superior to gelled acids containing guar gum or gum karaya in place of the xanthan gum. The gelled acids are generally stable enough that they can be mixed as long as 24 hours prior to use without significant loss in viscosity.

The novel gelled acids containing the present inhibitors are also superior to the gelled aqueous acids described in U.S. Pat. No. 3,236,305 in that the present gelled acids do not crosslink in the presence of ferric ion during acidizing treatments.

The present invention therefore results in a substantial advance in the art of acidizing fluids which are used to increase permeability of subterranean formations.

DETAILED DESCRIPTION OF THE INVENTION

The novel inhibitors used herein are a known class of organic compounds, each member of which is suitable for use herein so long as the selected compound(s) is compatible with the treatment acid or treatment acid system and is effective in inhibiting the production of ferric ions and/or is effective in inhibiting or preventing the formation and precipitation of insoluble ferric compounds during conditions of use in acidizing treatments of wells. Members of this known class of compounds include ascorbic acid, erythorbic acid and other isomers of the general formula

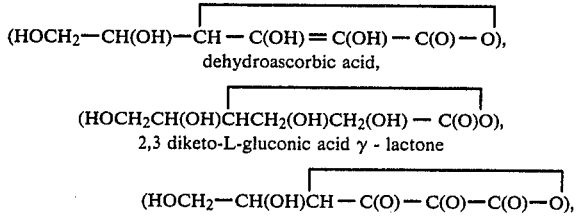

(HOCH$_2$—CH(OH)—CH—C(OH)=C(OH)—C(O)—O),
dehydroascorbic acid, (HOCH$_2$CH(OH)CHCH$_2$(OH)CH$_2$(OH)—C(O)O),
2,3 diketo-L-gluconic acid $\gamma$ - lactone (HOCH$_2$—CH(OH)CH—C(O)—C(O)—C(O)—O), and the corresponding acid, threonic acid (HOCH$_2$CH(OH)C(OH)—COOH), and the like. In many instances, it is a procedural advantage to add such inhibitors to the treatment acid as the alkali metal or ammonium salts thereof because of the faster dissolution rate of the salts. Of course, when the salts are dissolved in the treatment acid, the salts are converted to the corresponding organic acid. The novel inhibitors are added in an amount sufficient to substantially inhibit or prevent cross-linking of the xanthan gum. This will also normally be sufficient to prevent or inhibit the formation of ferric ions and/or the formation and precipitation of insoluble ferric compounds during conditions of use in acidizing treatments of wells. Normally, the inhibitors will be added in an amount of from about 0.1 to about 400 pounds of inhibitor per 1,000 gallons of treatment acid. Preferred limits normally are from about 1 to about 100 pounds per 1,000 gallons of treatment acid. The preferred inhibitors are ascorbic acid and erythorbic acid, with erythorbic acid being the most preferred.

The treatment acid can be any of the conventional treating acids. Examples of such acids include hydrochloric acid, fluoboric acid, hydrochloric/hydrofluoric acid mixtures, sulfamic acid, formic acid, acetic acid, hydroxyacetic acid, and the like. Mixtures of acids are used in many instances and are also suitable for use herein. The preferred treating acids are hydrochloric acid, HCL/HF mixtures known as mud acid, and fluoboric acid. The most preferred treatment acid is hydrochloric acid at concentrations of from about 5 to about 15 percent and mud acid containing a mixture of about 12 percent hydrochloric acid and about 3 percent hydrofluoric acid. The aqueous treating acid used in the present invention can be substantially any which is capable of dissolving solid formation materials located within subterranean earthen formation in a manner which increases the permeability of that formation.

The thickening agent used herein is a xanthan gum. Such xanthan gums are well known, as shown by U.S. Pat. No. 3,236,305, the disclosure of which is incorporated herewith by reference. Xanthan gum is a high molecular weight natural carbohydrate, or more specifically it is a polysaccharide. Xanthan gum defines the exocellular biopolysaccharide which is produced in a pure culture fermentation process by the microorganism *Xanthomonas campestris*. In the fermentation, this microorganism is cultured in a well areated medium containing commercial glucose, a suitable nitrogen source, dipotassium hydrogen phosphate, and appropriate trace elements. To provide seed for the final fermentation, the stated microorganism is grown in several stages with associated identification tests prior to introduction into the final fermentation medium. At the conclusion of the fermentation process xanthan gum is recovered by precipitation in isopropyl alcohol, then dried and milled. One xanthan gum has been sold commercially as Polysaccharide B-1459. Commercial bulletins on xanthan gums (specifically the trade bulletin offered by Kelco Division of Merck and Co. entitled "Xanthan Gum", 2nd Edition,) give the physical and chemical properties of xanthan gums. This bulletin shows xanthan gums to be: useful in increasing the viscosity of aqueous solutions; soluble in acid solutions (e.g. 5–10 percent HCl); and having temperature stability in deionized water. The bulletin also shows that the gums are subject to forming crosslinked gels in the presence of certain polyvalent metal ions and also notes that at elevated temperature acid hydrolysis of the xanthan gum is accelerated.

The xanthan gums and the novel ferric inhibitors can be preblended in most instances to form a stable solid mixture, or they can be predissolved in water or a dilute aqueous solution (e.g. dilute HCl) to form a liquid concentrate which can be more readily pumped and blended into the aqueous treatment acid. These solid mixtures and aqueous concentrates of xanthan gum and the present inhibitors are new compositions of matter. The amounts of each component can be varied, as noted above, to provide the desired viscosity and also the desired degree of inhibition against the effects of ferric ion. A preferred ratio of components, however, is from about 4 to about 6 parts of xanthan gum per part by weight of the inhibitor (e.g. sodium erythorbate).

Other conventional additives can be included in the formulated gelled acid compositions, if desired. For example, acid corrosion inhibitors are typically included in treatment acids and are beneficial here as well. Such acid corrosion inhibitors are known classes of compounds and include, for example, acetylenic alcohols, nitrogen-based corrosion inhibitors, etc. Such acid corrosion inhibitors have been amply described in the prior art.

In the practice of the present invention, the novel ferric inhibitors are normally preblended with the xanthan gum and the mixture added to the aqueous treatment acid with stirring or other form of agitation to form a smooth uniform gel.

The gelled acid composition can then be used in acidizing treatments of wells to increase the permeability of subterranean formations surrounding wellbores. In such treatments, the gelled acid compositions can then be injected into the well by conventional techniques and otherwise used in a conventional manner. Of course, the aqueous gelled acids can be preceded by or followed by other treatment fluids to achieve particularly desired results. For example, it is conventional to use aqueous ammonium chloride to predetermine injectivity of the well prior to filling the wellbore with acid. The treatment of formations containing clay in siliceous fines is maximized by the processes of Thomas in U.S. Pat. No. 4,151,878 and 4,151,879. If the Thomas procedure(s) is followed, the present gelled acid may be used as either the initial treatment acid (e.g. mud acid) and/or the gelled fluoboric acid.

EXPERIMENTAL

The following examples further illustrate the invention:

EXAMPLE 1

A gelled acid solution composed of 15% hydrochloric acid, 0.6% xanthan polymer and 2000 mg/l $Fe^{+++}$ (added as $FeCl_3$) was placed in a glass container and calcium carbonate chips added in order to spend the acid. The container was placed in a 150° F. water bath for 18 hours. At the end of this period, the acid was spent and the $Fe^{+++}$ had crosslinked the xanthan polymer to a rigid gel-like consistency.

The same test was repeated except that 0.1% erythorbic acid was added prior to spending of the acid. In this test, no increase in viscosity, due to $Fe^{+++}$ crosslinking was observed.

EXAMPLE 2

An oil well, producing from the San Andres formation of West Texas, was treated with 10,200 gal. of 15% hydrochloric acid containing 0.1% erythorbic acid, 0.6% xanthan gum and 6300 lbs. of 100 mesh NaCl (NaCl added for fluid loss control). The treatment fluid was pumped at a rate of about 4.8 barrels per minute against a treating pressure of 1200 psi. Prior to the treatment the well produced at a rate of 25 barrels of oil per day (BOPD). Thirty days after the treatment the same well produced at a rate of 42 BOPD.

What is claimed:

1. A method of inhibiting the cross-linking of an aqueous solution of xanthan gum in the presence of ferric ion at a pH above about 1.3 comprising adding to an aqueous solution of non-crosslinked xanthan gum, at a pH less than about 1.5, ascorbic acid and/or erythorbic acid, and/or a soluble salt of said acid in an amount sufficient to inhibit or prevent the crosslinking of the xanthan gum in the presence of ferric ion.

2. A method of preparing an aqueous gelled acid inhibited against cross-linking in the presence of ferric ion comprising adding to an aqueous acid at a pH of less than about 1.5 (a) a xanthan gum, and (b) a soluble alkanoic and/or alkenoic acid, and/or a soluble salt of said acid in an amount sufficient to inhibit or prevent the crosslinking of the xanthan gum in the presence of ferric ion.

3. The method defined by claim 2 wherein (a) and (b) are added as a solid mixture or a liquid concentrate.

4. The method defined by claim 3 wherein (a) and (b) are added as a solid mixture of xanthan gum and an alkali metal or ammonium salt of (b).

5. A mixture of (a) a xanthan gum and (b) ascorbic and or erythorbic acid, and/or a soluble salt of said acid wherein the ratio of (a) to (b) is from about 4 to about 6 parts by weight of (a) per part by weight of (b); said mixture having the chemical property of forming an aqueous gelled acid inhibited against crosslinking in the presence of ferric ion when mixed with an aqueous acid.

6. The mixture defined by claim 5 wherein said mixture is a solid mixture or an aqueous liquid concentrate of (a) and (b).

7. The mixture defined by claim 6 wherein said mixture is a solid mixture of xanthan gum and an alkali metal or ammonium salt of (b).

8. A gelled aqueous acid composition comprising an aqueous acid at a pH of less than about 1.5, a gelling amount of a xanthan gum, and a soluble alkanoic and/or alkenoic acid having at least 4 carbon atoms and bearing at least 2 hydroxyl groups per molecule, and/or a soluble salt of said acid in an amount sufficient to inhibit crosslinking of said xanthan gum in the presence of ferric ion.

9. In the method of increasing permeability of a subterranean formation surrounding a wellbore by contact with a treatment acid, the improvement of using the gelled aqueous acid defined by claim 8 as the treatment acid.

10. The method defined by claim 1 wherein acid is erythorbic acid.

11. The method defined by claim 2 wherein acid is erythorbic acid.

12. The mixture defined by claim 5 wherein acid is erythorbic acid.

13. The composition defined by claim 8 wherein acid is erythorbic acid.

* * * * *

UNITED STATES PATENT AND TRADEMARK OFFICE
CERTIFICATE OF CORRECTION

PATENT NO. : 4,317,735

DATED : Mar. 2, 1982

INVENTOR(S) : Curtis W. Crowe

It is certified that error appears in the above—identified patent and that said Letters Patent is hereby corrected as shown below:

Claim 8, lines 29-31, delete "a soluble alkanoic and/or alkenoic acid having at least 4 carbon atoms and bearing at least 2 hydroxyl groups per molecule" and insert -- ascorbic acid and/or erythorbic acid --.

Signed and Sealed this

Twenty-ninth Day of June 1982

[SEAL]

Attest:

GERALD J. MOSSINGHOFF

Attesting Officer    Commissioner of Patents and Trademarks